United States Patent
Baamonde Lorenzo

(10) Patent No.: US 12,304,123 B2
(45) Date of Patent: May 20, 2025

(54) PEDESTRIAN SAFE FRONT PANEL/GRILLE HAVING A TWO-SHOT MOLDED DECORATIVE PART

(71) Applicant: SRG Global Liria, S.L., Liria (ES)

(72) Inventor: Pablo Baamonde Lorenzo, Liria (ES)

(73) Assignee: SRG GLOBAL LIRIA, S.L., Liria (ES)

( * ) Notice: Subject to any disclaimer, the term of this patent is extended or adjusted under 35 U.S.C. 154(b) by 333 days.

(21) Appl. No.: 17/677,116

(22) Filed: Feb. 22, 2022

(65) Prior Publication Data

US 2022/0266489 A1 Aug. 25, 2022

(30) Foreign Application Priority Data

Feb. 23, 2021 (ES) .................. ES202130151

(51) Int. Cl.
*B29C 45/16* (2006.01)
*B29C 45/02* (2006.01)
*B60R 13/00* (2006.01)
*B60R 13/04* (2006.01)
*B29K 69/00* (2006.01)
(Continued)

(52) U.S. Cl.
CPC .......... *B29C 45/1679* (2013.01); *B29C 45/02* (2013.01); *B60R 13/00* (2013.01); *B60R 13/04* (2013.01); *B29K 2069/00* (2013.01); *B29K 2075/00* (2013.01); *B29K 2995/0025* (2013.01); *B29K 2995/0026* (2013.01); *B29K 2995/0082* (2013.01); *B29L 2031/3005* (2013.01)

(58) Field of Classification Search
CPC ....... B60R 13/00; B60R 13/005; B60R 13/04; B29K 2069/00; B29K 2075/00; B29K 2995/0025; B29K 2995/0026; B29C 45/1679; B29C 45/02; B29L 2031/3005
See application file for complete search history.

(56) References Cited

U.S. PATENT DOCUMENTS 3,705,742 A 12/1972 Lipscomb
3,895,835 A 7/1975 Thomson
(Continued)

FOREIGN PATENT DOCUMENTS

CA 2517940 A1 * 3/2006 ......... B29C 45/0013
DE 102004035759 A1 3/2006
(Continued)

OTHER PUBLICATIONS

International Search Report dated May 12, 2022. 13 pages.
(Continued)

*Primary Examiner* — Daniel J Colilla
(74) *Attorney, Agent, or Firm* — Alston & Bird LLP

(57) ABSTRACT

A method of multi-shot injection molding of a decorative part for a front-end of a vehicle includes performing a first injection molding shot of a transparent plastic material to form an A-side portion of the decorative part and performing a second injection molding shot of an opaque elastomeric material for form a B-side portion of the decorative part. A multi-shot injection molded decorative part for a front-end of a vehicle includes an A-side portion formed by performing a first injection molding shot of a transparent plastic material and a B-side portion formed by performing a second injection molding shot of an opaque elastomeric material.

16 Claims, 4 Drawing Sheets

Sample plain plaque & with decoration

(51) Int. Cl.
  *B29K 75/00* (2006.01)
  *B29L 31/30* (2006.01)

(56) References Cited

U.S. PATENT DOCUMENTS

| | | |
|---|---|---|
| 3,937,508 A | 2/1976 | Glance et al. |
| 3,948,497 A | 4/1976 | Lovitt et al. |
| 3,971,583 A | 7/1976 | Kornhauser |
| 4,282,816 A | 8/1981 | Harrison |
| 4,325,574 A | 4/1982 | Umemoto et al. |
| 4,411,462 A | 10/1983 | Buehrig et al. |
| 4,441,751 A | 4/1984 | Wesley |
| 4,804,169 A | 2/1989 | Hassan |
| 4,854,792 A | 8/1989 | Cottone |
| 5,150,935 A | 9/1992 | Glance et al. |
| 5,199,755 A | 4/1993 | Gertz |
| 5,452,931 A | 9/1995 | Chase |
| 5,478,127 A | 12/1995 | Chase |
| 5,482,336 A | 1/1996 | Rouse et al. |
| 5,487,575 A | 1/1996 | Chase |
| 5,503,444 A | 4/1996 | Rouse et al. |
| 5,605,736 A | 2/1997 | Zohar et al. |
| 5,989,479 A | 11/1999 | Yamasaki et al. |
| 6,214,266 B1 | 4/2001 | Millif et al. |
| 6,364,397 B1 | 4/2002 | Bordeaux et al. |
| 6,390,538 B1 | 5/2002 | Hashimoto et al. |
| 6,395,219 B1 | 5/2002 | Preisler et al. |
| 6,398,897 B1 | 6/2002 | Preisler et al. |
| 6,460,926 B1 | 10/2002 | Neale |
| 6,461,017 B2 | 10/2002 | Selkee |
| 6,620,371 B1 | 9/2003 | Winget et al. |
| 6,695,366 B2 | 2/2004 | Cherry |
| 6,715,790 B2 | 4/2004 | Breed |
| 6,818,305 B2 | 11/2004 | Murar et al. |
| 6,923,286 B2 | 8/2005 | Sato et al. |
| 6,923,494 B2 | 8/2005 | Shuler et al. |
| 6,994,384 B2 | 2/2006 | Shuler et al. |
| 7,114,764 B1 | 10/2006 | Barsoum et al. |
| 7,147,808 B2 | 12/2006 | Cowelchuk et al. |
| 7,156,543 B2 | 1/2007 | Nakamura et al. |
| 7,192,080 B2 | 3/2007 | Marijnissen et al. |
| 7,392,876 B2 | 7/2008 | Browne et al. |
| 7,396,147 B2 | 7/2008 | Munro |
| 7,538,734 B2 | 5/2009 | Fujii et al. |
| 7,568,746 B2 | 8/2009 | Jaarda et al. |
| 7,952,469 B2 | 5/2011 | Suzuki et al. |
| 7,954,871 B2 | 6/2011 | Hipshier |
| 8,048,499 B2 | 11/2011 | Katayama et al. |
| 8,398,132 B2 | 3/2013 | Sturdee |
| 8,822,007 B2 | 9/2014 | Vigour et al. |
| 8,828,518 B2 | 9/2014 | Paruchuri et al. |
| 9,231,391 B2 | 1/2016 | Hudry et al. |
| 9,233,656 B2 | 1/2016 | Kil et al. |
| 9,296,354 B1 | 3/2016 | Preisler et al. |
| 9,434,326 B2 | 9/2016 | Walters |
| 9,561,707 B1 | 2/2017 | Walicki, Sr. et al. |
| 9,783,152 B2 | 10/2017 | Voss et al. |
| 9,863,600 B2 | 1/2018 | Kieslich |
| 10,246,044 B2 | 4/2019 | Barbat et al. |
| 2002/0041964 A1 | 4/2002 | Winget et al. |
| 2003/0008134 A1 | 1/2003 | Murar et al. |
| 2004/0021961 A1 | 2/2004 | Munro |
| 2004/0036302 A1 | 2/2004 | Shuler et al. |
| 2004/0094977 A1 | 5/2004 | Shuler et al. |
| 2004/0174025 A1 | 9/2004 | Converse et al. |
| 2005/0002196 A1 | 1/2005 | Nakamura et al. |
| 2005/0275246 A1 | 12/2005 | Browne et al. |
| 2006/0008620 A1 | 1/2006 | Cowelchuk et al. |
| 2006/0024476 A1 | 2/2006 | Leland et al. |
| 2006/0082179 A1 | 4/2006 | Depue et al. |
| 2006/0261665 A1 | 11/2006 | Gomora-camargo et al. |
| 2007/0085361 A1 | 4/2007 | Hauser |
| 2007/0109206 A1 | 5/2007 | Fujii et al. |
| 2007/0200376 A1 | 8/2007 | Jaarda et al. |
| 2007/0278803 A1 | 12/2007 | Jaarda et al. |
| 2008/0122599 A1 | 5/2008 | Suzuki et al. |
| 2008/0145635 A1 | 6/2008 | Stoll et al. |
| 2008/0206538 A1 | 8/2008 | Katayama et al. |
| 2008/0233367 A1* | 9/2008 | Maeda ............... H01Q 1/40 427/58 |
| 2009/0256370 A1 | 10/2009 | Siler et al. |
| 2010/0045060 A1 | 2/2010 | Hipshier |
| 2010/0080939 A1 | 4/2010 | Kastrup et al. |
| 2010/0289197 A1 | 11/2010 | Leonard et al. |
| 2011/0030711 A1* | 2/2011 | Han ............... B29C 45/27 132/73 |
| 2011/0088827 A1 | 4/2011 | Zanini et al. |
| 2013/0059108 A1 | 3/2013 | Vigour et al. |
| 2014/0008096 A1 | 1/2014 | Hudry et al. |
| 2014/0054914 A1 | 2/2014 | Teoh et al. |
| 2014/0062116 A1 | 3/2014 | Guitton |
| 2014/0333077 A1 | 11/2014 | Kil et al. |
| 2015/0239286 A1 | 8/2015 | Boswell-horstmeyer |
| 2017/0232925 A1 | 8/2017 | Barbat et al. |
| 2017/0232926 A1 | 8/2017 | Barbat et al. |
| 2018/0090831 A1* | 3/2018 | Frayer ............... C23C 18/1641 |
| 2019/0071130 A1 | 3/2019 | Ginja |
| 2019/0111599 A1 | 4/2019 | Matsuo et al. |
| 2019/0322211 A1 | 10/2019 | Kim et al. |
| 2020/0103093 A1 | 4/2020 | Negel et al. |
| 2022/0123458 A1* | 4/2022 | Yanagi ............... B60R 13/005 |

FOREIGN PATENT DOCUMENTS

| | | |
|---|---|---|
| DE | 102006055996 A1 | 5/2008 |
| DE | 102004035759 | 5/2014 |
| DE | 102006055996 | 5/2019 |
| EP | 0012697 | 6/1980 |
| EP | 0507496 A1 | 10/1992 |
| EP | 0665935 B1 | 3/1997 |
| EP | 0777590 A1 | 6/1997 |
| EP | 0674052 B1 | 1/1998 |
| EP | 0833757 A1 | 4/1998 |
| EP | 1072380 A2 | 1/2001 |
| EP | 1076619 A1 | 2/2001 |
| EP | 1085992 A1 | 3/2001 |
| EP | 1107877 A1 | 6/2001 |
| EP | 0597624 B1 | 10/2001 |
| EP | 0749872 B1 | 4/2003 |
| EP | 1377777 A1 | 1/2004 |
| EP | 1400404 A1 | 3/2004 |
| EP | 1473189 A2 | 11/2004 |
| EP | 1525112 A2 | 4/2005 |
| EP | 1565350 A2 | 8/2005 |
| EP | 1104726 B1 | 9/2005 |
| EP | 1603774 B1 | 12/2005 |
| EP | 1603788 A2 | 12/2005 |
| EP | 1614590 A2 | 1/2006 |
| EP | 1719640 A1 | 11/2006 |
| EP | 1719691 A1 | 11/2006 |
| EP | 1764270 A1 | 3/2007 |
| EP | 1848581 A2 | 10/2007 |
| EP | 1916157 A1 | 4/2008 |
| EP | 1737692 B1 | 7/2008 |
| EP | 1948486 A2 | 7/2008 |
| EP | 1948487 A1 | 7/2008 |
| EP | 2035261 A1 | 3/2009 |
| EP | 1338483 B1 | 4/2009 |
| EP | 2052833 A1 | 4/2009 |
| EP | 1810892 B1 | 7/2009 |
| EP | 1925511 B1 | 8/2009 |
| EP | 2139013 A1 | 12/2009 |
| EP | 2250032 A1 | 11/2010 |
| EP | 1986890 B1 | 12/2010 |
| EP | 2259951 A1 | 12/2010 |
| EP | 2311689 A1 | 4/2011 |
| EP | 1817212 B1 | 11/2011 |
| EP | 2112025 B1 | 9/2012 |
| EP | 1344688 B1 | 11/2012 |
| EP | 2527202 A1 | 11/2012 |
| EP | 2530352 A2 | 12/2012 |
| EP | 2758282 A1 | 7/2014 |
| EP | 2525993 B1 | 5/2015 |
| EP | 2692024 B1 | 5/2015 |

(56) References Cited

FOREIGN PATENT DOCUMENTS

| | | | | |
|---|---|---|---|---|
| EP | 2681068 B1 | 2/2016 | | |
| EP | 2796325 B1 | 3/2018 | | |
| EP | 3150442 B1 | 3/2018 | | |
| EP | 2572936 B1 | 2/2019 | | |
| EP | 3048015 B1 | 6/2019 | | |
| EP | 3526067 A1 | 8/2019 | | |
| EP | 2351946 B1 | 11/2019 | | |
| FR | 2903340 A1 * | 1/2008 | ......... | B29C 45/1635 |
| JP | 2015112841 A * | 6/2015 | | |
| JP | 2016150497 A | 8/2016 | | |
| WO | 9316902 A1 | 9/1993 | | |
| WO | 9409310 A1 | 4/1994 | | |
| WO | 9534445 A1 | 12/1995 | | |
| WO | 9606756 A1 | 3/1996 | | |
| WO | 9620842 A1 | 7/1996 | | |
| WO | 9625308 A1 | 8/1996 | | |
| WO | 9700180 A1 | 1/1997 | | |
| WO | 9739263 A1 | 10/1997 | | |
| WO | 9956990 A1 | 11/1999 | | |
| WO | 9962739 A1 | 12/1999 | | |
| WO | 0208015 A1 | 1/2002 | | |
| WO | 02075206 A1 | 9/2002 | | |
| WO | 03095267 A2 | 11/2003 | | |
| WO | 2004012955 A2 | 2/2004 | | |
| WO | 2004045910 A2 | 6/2004 | | |
| WO | 2004080765 A1 | 9/2004 | | |
| WO | 2004083020 A2 | 9/2004 | | |
| WO | 2005102758 A1 | 11/2005 | | |
| WO | 2006016053 A2 | 2/2006 | | |
| WO | 2006035150 A1 | 4/2006 | | |
| WO | 2006046771 A1 | 5/2006 | | |
| WO | 2006086446 A2 | 8/2006 | | |
| WO | 2007097878 A1 | 8/2007 | | |
| WO | 2007139372 A1 | 12/2007 | | |
| WO | 2008005625 A1 | 1/2008 | | |
| WO | 2008073541 A1 | 6/2008 | | |
| WO | 2009007935 A2 | 1/2009 | | |
| WO | 2009101355 A1 | 8/2009 | | |
| WO | 2009126670 A1 | 10/2009 | | |
| WO | 2010049502 A1 | 5/2010 | | |
| WO | 2011088858 A1 | 7/2011 | | |
| WO | 2012004035 A1 | 1/2012 | | |
| WO | 2012116805 A1 | 9/2012 | | |
| WO | 2012128606 A1 | 9/2012 | | |
| WO | 2012131204 A1 | 10/2012 | | |
| WO | 2012143715 A1 | 10/2012 | | |
| WO | 2013041254 A1 | 3/2013 | | |
| WO | 2013095046 A1 | 6/2013 | | |
| WO | 2013175104 A2 | 11/2013 | | |
| WO | 2014158711 A1 | 10/2014 | | |
| WO | 2015150657 A1 | 10/2015 | | |
| WO | 2015152399 A1 | 10/2015 | | |
| WO | WO-2016008790 A1 * | 1/2016 | ....... | B29C 45/14688 |
| WO | 2017016763 A1 | 2/2017 | | |
| WO | 2017144949 A1 | 8/2017 | | |
| WO | 2017205046 A1 | 11/2017 | | |
| WO | 2018072869 A1 | 4/2018 | | |
| WO | 2018073087 A1 | 4/2018 | | |
| WO | 2018126145 A2 | 7/2018 | | |
| WO | 2018161068 A1 | 9/2018 | | |
| WO | 2019053621 A1 | 3/2019 | | |

OTHER PUBLICATIONS

International Preliminary Report on Patentability received for PCT Application No. PCT/US2022/017425, mailed on Sep. 7, 2023, 8 pages.

International Search Report and Written Opinion received for PCT Application No. PCT/US2022/017425, mailed on May 12, 2022, 11 pages.

* cited by examiner

PEDESTRIAN SAFE FRONT PANEL/GRILLE HAVING A TWO-SHOT MOLDED DECORATIVE PART

CROSS-REFERENCE TO RELATED APPLICATION(S)

The present application claims the benefit of Spanish Application Number P202130151, filed on Feb. 23, 2021. The disclosure of the above-identified application is incorporated herein by reference in its entirety.

FIELD

The present application relates to a pedestrian safe vehicle front panel/grille having a two-shot (2K) injection mold decorative part.

BACKGROUND

Currently, achieving a decorative appearance of a decorative part of a vehicle front panel or grille with a satisfactory or desired depth of image requires substantially increasing (e.g., doubling) the thickness of the grille. This increasing of the thickness also stiffens the decorative part such that pedestrians who may be involved with a collision with the grille could sustain injury as the force of the impact is borne by the pedestrian. This substantial increase in thickness increases material and part costs. Thus, while conventional vehicle front panels/grilles with decorative parts do work for their intended purpose, there remains a desire for improvement in the relevant art.

SUMMARY

According to one aspect of the present disclosure, a method of multi-shot injection molding of a decorative part for a front-end of a vehicle is presented. In one exemplary implementation, the method comprises performing a first injection molding shot of a transparent plastic material to form an A-side portion of the decorative part, and performing a second injection molding shot of an opaque elastomeric material for form a B-side portion of the decorative part.

In some implementations, the opaque elastomeric material defines a decoration of the decorative part without substantially increasing a rigidity of the decorative part above a rigidity of the A-side portion of the decorative part. In some implementations, the opaque elastomeric material does not increase the rigidity of the decorative part above a rigidity of the A-side portion of the decorative part. In some implementations, the non-substantial increase in the rigidity of the decorative part provides for a decreased chance of the vehicle causing harm to a pedestrian during a front-end collision. In some implementations, the decorative part is part of a front panel or grille of the vehicle. In some implementations, the transparent plastic material is polycarbonate (PC) and the opaque elastomeric material is a thermoplastic elastomer (TPE). In some implementations, the TPE is thermoplastic polyurethane (TPU). In some implementations, the multi-shot injection molding comprises only two shots. In some implementations, the multi-shot injection molding comprises three or more shots.

According to another aspect of the present disclosure, a multi-shot injection molded decorative part for a front-end of a vehicle is presented. In one exemplary implementation, the part comprises an A-side portion formed by performing a first injection molding shot of a transparent plastic material, and a B-side portion formed by performing a second injection molding shot of an opaque elastomeric material.

In some implementations, the opaque elastomeric material defines a decoration of the decorative part without substantially increasing a rigidity of the decorative part above a rigidity of the A-side portion of the decorative part. In some implementations, the opaque elastomeric material does not increase the rigidity of the decorative part above a rigidity of the A-side portion of the decorative part. In some implementations, the non-substantial increase in the rigidity of the decorative part provides for a decreased chance of the vehicle causing harm to a pedestrian during a front-end collision. In some implementations, the part is a part of a front panel or grille of the vehicle. In some implementations, the transparent plastic material is polycarbonate (PC) and the opaque elastomeric material is a thermoplastic elastomer (TPE). In some implementations, the TPE is thermoplastic polyurethane (TPU). In some implementations, the multi-shot injection molding process to form the decorative part comprises only two shots. In some implementations, the multi-shot injection molding process to form the decorative part comprises three or more shots.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the substance of the present disclosure are intended to be within the scope of the present disclosure.

DETAILED DESCRIPTION

Figure 1:
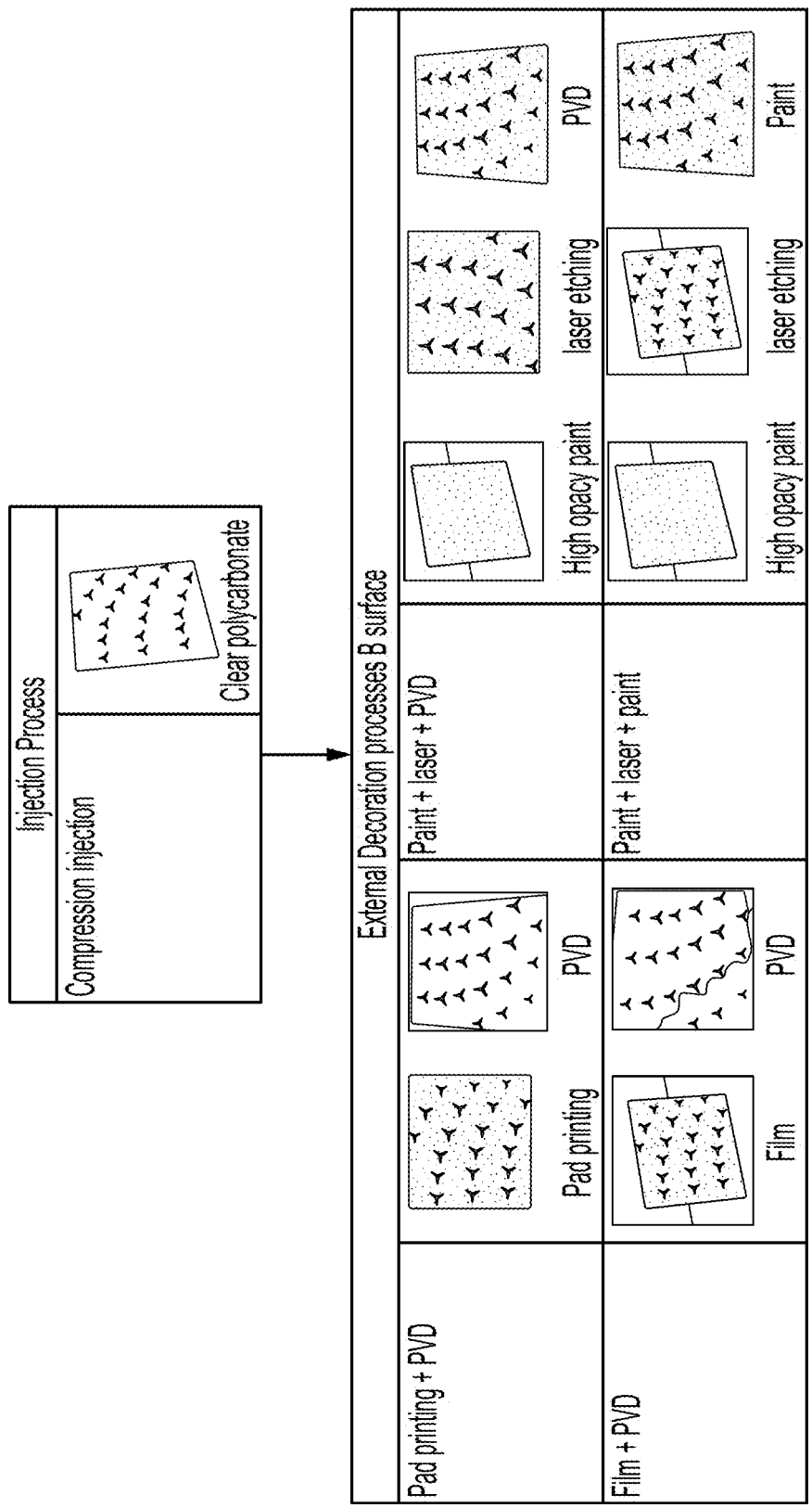
FIG. 1 illustrates complex multi-step decorative part formation processes that are alternate solutions to some implementations of the present disclosure.

As previously discussed, the problem with previous designs is that they require substantially increasing (e.g., doubling) the thickness of the decorative part, which stiffens the decorative part such that pedestrians who may be involved with a collision with the grille could sustain injury as the force of the impact is borne by the pedestrian. Some examples of alternate complex, multi-step decorative part formation solutions include (1) polycarbonate (PC) plus paint on B-side and laser-etching on B-side to remove paint in areas to be transparent, (2) PC plus pad printing, and (3) PC plus injection molding in-mold labeling (IML)/in-mold decorating (IMD) as illustrated in FIG. 1. As can be seen, these processes may include additional steps and/or more complex/costly processing via many different processing techniques/machines (e.g., molding, painting, laser etching, etc.). Decoration from the B-side that would result in substantially higher part thicknesses would also not be convenient to vehicle manufacturers (e.g., original equipment manufacturers, or OEMs) due to weight impact and pedestrian safety.

Figure 2:
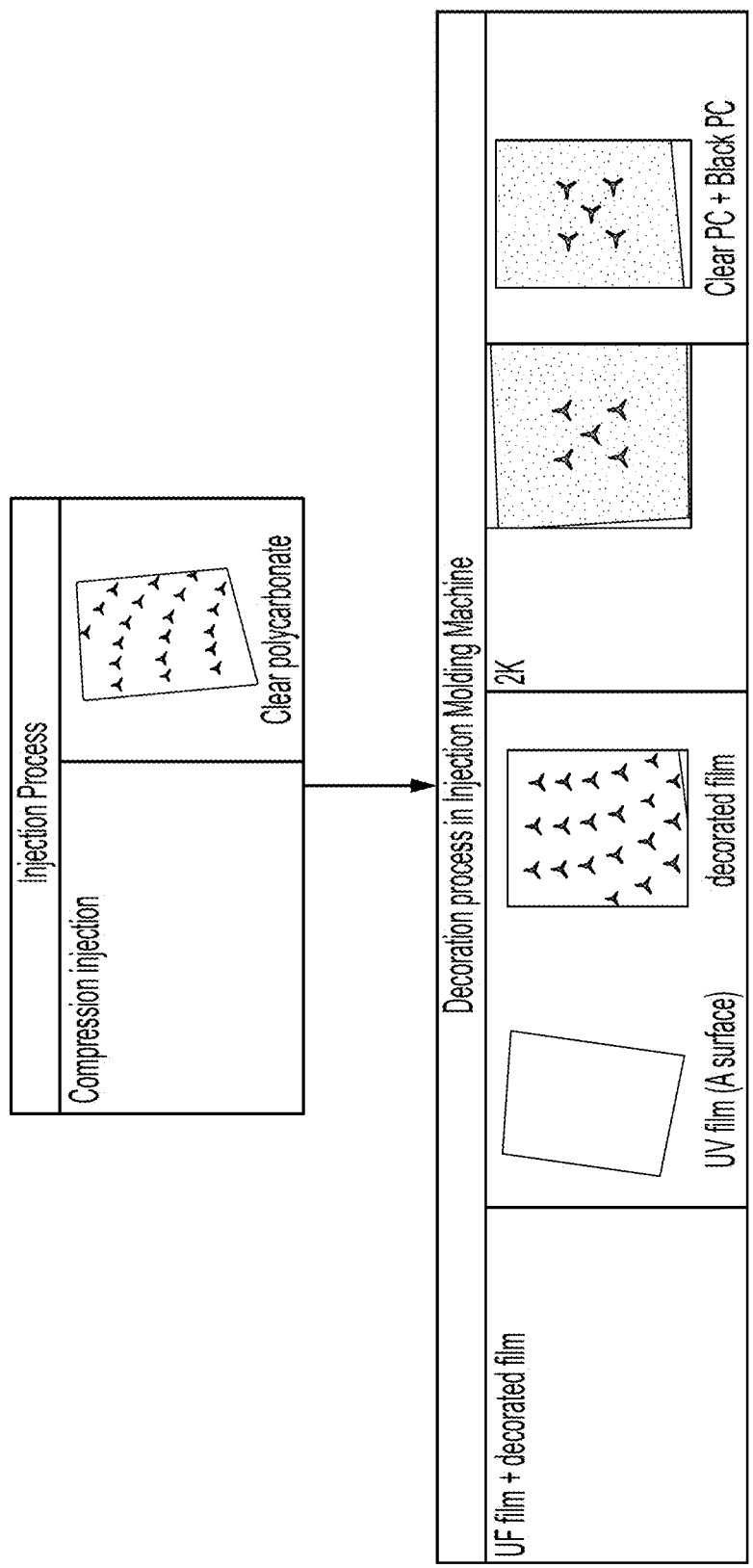
FIG. 2 illustrates an improved decorative part formation process according to some implementations of the present disclosure.

According to some implementations of the present disclosure, decoration from the B-side of a clear material is performed with a material that doesn't increase stiffness of the part (e.g., the same stiffness as a 1K or one-shot part, such as a single PC shot), and may impart greater flexibility without the risk of damage. The proposed processes/concepts of the present disclosure as shown in FIG. 2 offer a lower cost method for achieving the same appearance as the more complex, multi-step solutions shown in FIG. 1 and described above and be a more competitive option form of decoration because part thicknesses/weight would not be substantially increased due to the layer thicknesses and materials used. In one specific embodiment of the present disclosure, a two-shot (2K) injection molding process (i.e., a single manufacturing step or process) for a decorative part of a vehicle front panel or grille is presented. 2K injection molding is more cost competitive (part in one manufacturing step) compared to other decoration methods with several steeps and higher scrap rates. It should be noted that while 2K injection molding is specifically discussed herein, it will be appreciated that there could be three or more injection molding shots for more complex designs.

Figure 3:
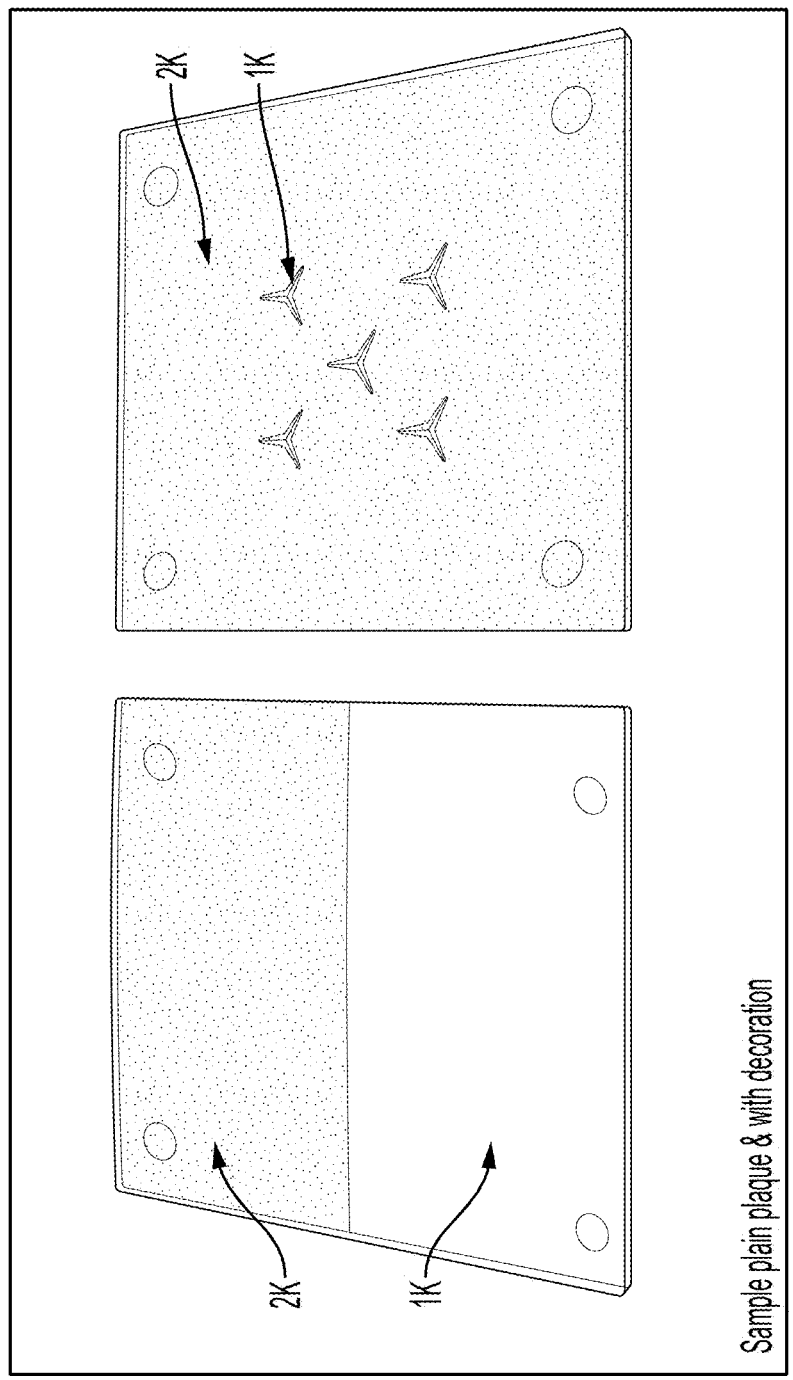
FIG. 3 illustrates example partial and fully formed decorative parts using the processes according to some implementations of the present disclosure.
Figure 4:
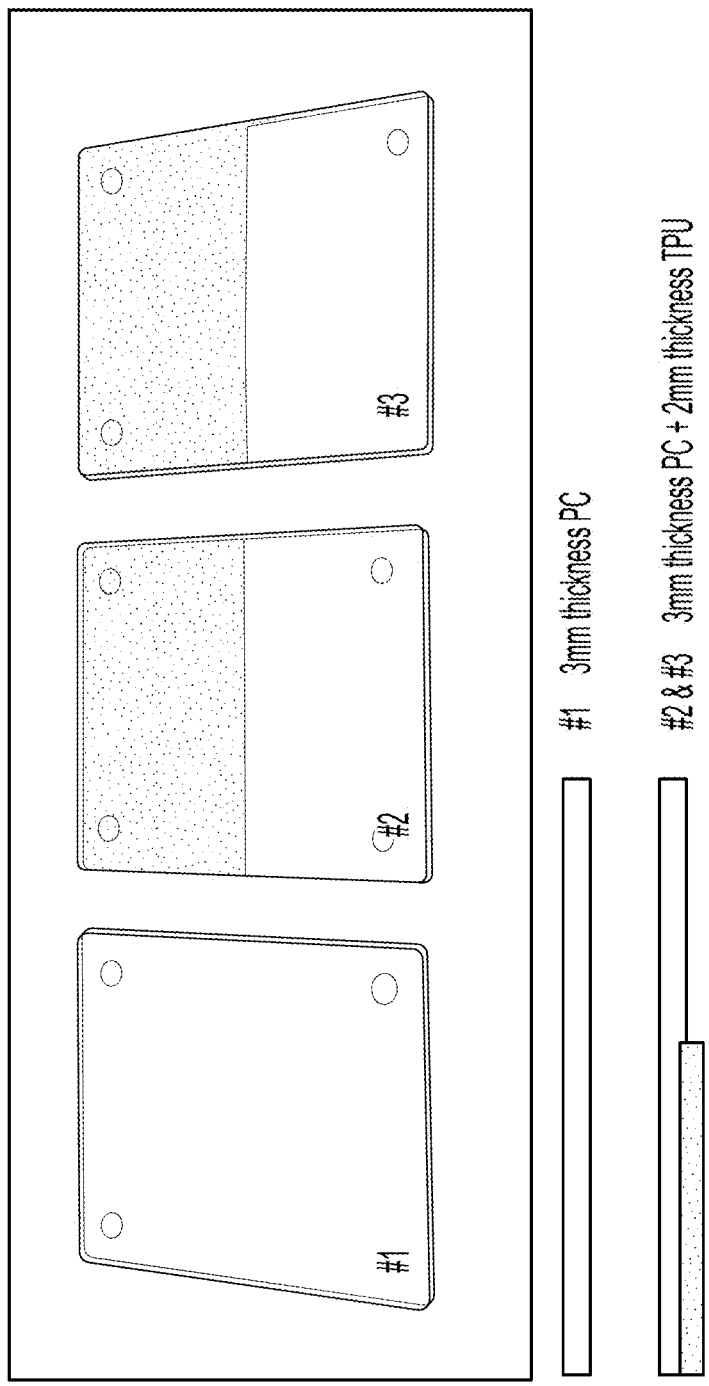
FIG. 4 illustrates example partially formed decorative parts and cross-sectional views of example layer thicknesses using the processes according to some implementations of the present disclosure

The addition of an elastomeric material (e.g., a thermoplastic elastomer, or TPE) to the back (B-side) of a primary polycarbonate (PC) sheet achieves the depth of image and decorative appearance desired by customers as shown in FIG. 3. In addition, the elastomeric material reduces the stiffness and rigidity of the polycarbonate sheet, allowing it to flex and absorb impact resulting from a pedestrian impact, reducing the likelihood of injuring the pedestrian. Improved testing could be performed for pedestrian impact for decorative parts placed in front of a vehicle. Taking advantage of 2K injection and combination of a PC and an elastomer, the stiffness of the part will not be increasing significantly nor will the weight as the elastomer allows to have thinner wall thickness as shown in FIG. 4. It will be appreciated that these are merely example thicknesses and the thicknesses could vary depending on the particular application, as could the type of elastomer material (e.g., a TPE, such as thermoplastic polyurethane or TPU). While 2K injection molding processes do exist already for many other applications, it has not been utilized for the combination of these thermoplastics (e.g., PC+TPE) to have decoration on B-side and less stiffness than being a combination of transparent and black PCs.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed herein could be termed a second element, component, region, layer or section without departing from the teachings of the example embodiments.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A method of multi-shot injection molding of a decorative part for a front-end of a vehicle, the method comprising:
    performing a first injection molding shot of a transparent plastic material to form an A-side portion of the decorative part; and
    performing a second injection molding shot of an opaque elastomeric material to form a B-side portion of the decorative part, a surface area defined by a length and width of the B-side portion being the same as a surface area defined by a length and a width of the A-side portion,
    wherein:
        the opaque elastomeric material forming the B-side portion does not substantially increase a total thickness of the decorative part;
        the transparent plastic material is polycarbonate (PC) and the opaque elastomeric material is a thermoplastic elastomer (TPE); and
        the thermoplastic elastomer (TPE) has a thickness of approximately 2 millimeters.

2. The method of claim 1, wherein the opaque elastomeric material defines a decoration of the decorative part without substantially increasing a rigidity of the decorative part above a rigidity of the A-side portion of the decorative part.

3. The method of claim 1, wherein the decorative part is part of a front panel or grille of the vehicle.

4. The method of claim 1, wherein the TPE is thermoplastic polyurethane (TPU).

5. The method of claim 1, wherein the multi-shot injection molding comprises only two shots.

6. The method of claim 1, wherein the multi-shot injection molding comprises three or more shots.

7. The method of claim 1, wherein the opaque elastomeric material increases at least an impact absorption of the decorative part, beyond that of the transparent plastic material alone.

8. The method of claim 1, wherein the polycarbonate (PC) has a thickness of approximately 3 millimeters and the decorative part has a total thickness of approximately 5 millimeters.

9. A multi-shot injection molded decorative part for a front-end of a vehicle, the part comprising:
    an A-side portion formed by performing a first injection molding shot of a transparent plastic material; and
    a B-side portion formed by performing a second injection molding shot of an opaque elastomeric material, a surface area defined by a length and width of the B-side portion being the same as a surface area defined by a length and a width of the A-side portion,
    wherein:
        the opaque elastomeric material forming the B-side portion does not substantially increase a total thickness of the decorative part defined by a combined thickness of the A-side portion and the B-side portion;
        the transparent plastic material is polycarbonate (PC) and the opaque elastomeric material is a thermoplastic elastomer (TPE); and
        the thermoplastic elastomer (TPE) has a thickness of approximately 2 millimeters.

10. The part of claim 9, wherein the opaque elastomeric material defines a decoration of the decorative part without substantially increasing a rigidity of the decorative part above a rigidity of the A-side portion of the decorative part.

11. The part of claim 10, wherein the decorative part is part of a front panel or grille of the vehicle.

12. The part of claim 9, wherein the TPE is thermoplastic polyurethane (TPU).

13. The part of claim 9, wherein the multi-shot injection molding process to form the decorative part comprises only two shots.

14. The part of claim 9, wherein the multi-shot injection molding process to form the decorative part comprises three or more shots.

15. The part of claim 9, wherein the opaque elastomeric material increases at least an impact absorption of the part.

16. The part of claim 9, wherein the polycarbonate (PC) has a thickness of approximately 3 millimeters and the decorative part has a total thickness of approximately 5 millimeters.

* * * * *